US012567193B2

(12) United States Patent
Xu et al.

(10) Patent No.: US 12,567,193 B2
(45) Date of Patent: Mar. 3, 2026

(54) PARTICLE RENDERING METHOD AND APPARATUS

(71) Applicant: Beijing Zitiao Network Technology Co., Ltd., Beijing (CN)

(72) Inventors: Liyou Xu, Beijing (CN); Jinyuan Wu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 217 days.

(21) Appl. No.: 18/551,738

(22) PCT Filed: Apr. 12, 2022

(86) PCT No.: PCT/CN2022/086353
§ 371 (c)(1),
(2) Date: Sep. 21, 2023

(87) PCT Pub. No.: WO2022/252831
PCT Pub. Date: Dec. 8, 2022

(65) Prior Publication Data
US 2024/0185454 A1 Jun. 6, 2024

(30) Foreign Application Priority Data

May 31, 2021 (CN) .......................... 202110600409.7

(51) Int. Cl.
*G06T 15/00* (2011.01)
*G06T 7/50* (2017.01)
(Continued)

(52) U.S. Cl.
CPC ................ *G06T 15/00* (2013.01); *G06T 7/50* (2017.01); *G06T 7/73* (2017.01); *G06T 13/00* (2013.01);
(Continued)

(58) Field of Classification Search
None
See application file for complete search history.

(56) References Cited

U.S. PATENT DOCUMENTS 7,692,647 B2 * 4/2010 Lin ........................ G06T 13/60
345/589
10,926,176 B1 2/2021 Snyder et al.
(Continued)

FOREIGN PATENT DOCUMENTS

CN 104778737 A 7/2015
CN 107886574 A 4/2018
(Continued)

OTHER PUBLICATIONS

Tan J, Fan X. Particle system based snow simulating in real time. Procedia Environmental Sciences. Jan. 1, 2011;10:1244-9. (Year: 2011).*
(Continued)

*Primary Examiner* — Zhengxi Liu

(57) ABSTRACT

The embodiments of the present disclosure provide a particle rendering method and apparatus, which relate to the technical field of image rendering. The method includes: obtaining state information of a target particle; obtaining a fall duration of the target particle if the state information is first state information indicating that no collision with the target particle occurred; obtaining a first position based on the fall duration and a fall speed of the target particle; and rendering the target particle to be at the first position.

17 Claims, 4 Drawing Sheets

(51) Int. Cl.
  *G06T 7/73*     (2017.01)
  *G06T 13/00*    (2011.01)
(52) U.S. Cl.
  CPC ...... *G06T 2210/21* (2013.01); *G06T 2210/56*
                                        (2013.01)

(56)                References Cited

U.S. PATENT DOCUMENTS

| | | | |
|---|---|---|---|
| 2003/0179203 A1 | 9/2003 | Bruderlin et al. | |
| 2008/0184124 A1 | 7/2008 | Agarwal et al. | |
| 2009/0083015 A1* | 3/2009 | McDaniel | G06F 30/20 |
| | | | 703/6 |
| 2009/0111579 A1* | 4/2009 | Komatsumoto | A63F 13/217 |
| | | | 463/32 |
| 2018/0182066 A1* | 6/2018 | Saleh | G06T 11/40 |
| 2018/0249144 A1 | 8/2018 | Feng et al. | |
| 2020/0279438 A1 | 9/2020 | Ohashi | |
| 2021/0385321 A1* | 12/2021 | Tran | G06F 3/0488 |
| 2023/0061935 A1 | 3/2023 | Benedicto et al. | |

FOREIGN PATENT DOCUMENTS

| | | |
|---|---|---|
| CN | 109191550 A | 1/2019 |
| CN | 110717269 A | 1/2020 |
| CN | 111127609 A | 5/2020 |
| CN | 111540035 A | 8/2020 |
| CN | 111667393 A | 9/2020 |
| CN | 112233214 A | 1/2021 |
| CN | 112652044 A | 4/2021 |

OTHER PUBLICATIONS

International Search Report and Written Opinion for International Application No. PCT/CN2022/086353, mailed Jun. 29, 2022, 12 pages.
International Search Report and Written Opinion for International Application No. PCT/CN2022/086528, mailed Jun. 22, 2022, 16 pages.
International Search Report and Written Opinion for International Application No. PCT/CN2022/086561, mailed Jun. 30, 2022, 14 pages.
Shader, Jun. 10, 2022, pp. 1-6 (9 Pages), Retrieved from URL: https://zhuanlan.zhihu.com/p/9594344408.12J=I2019.
Shadertoy: "Starry Sky," Views: 1878, Tags: Star, Sky, Dec. 7, 2019, 2 Pages, [Retrieved on Dec. 20, 2023] Retrieved from URL: https://www.shadertoy.com/view/tdKSWy.
Non-Final Office Action mailed on Jun. 27, 2025, for U.S. Appl. No. 18/552,777, pp. 27.
Office action received from Chinese patent application No. 202110600409.7 mailed on Jun. 14, 2025, 14 pages (7 pages English Translation and 7 pages Original Copy).

* cited by examiner

500

1

PARTICLE RENDERING METHOD AND APPARATUS

CROSS-REFERENCE TO RELATED APPLICATIONS

The present disclosure is a U.S. National Stage Application under 35 U.S.C. § 371 of International Patent Application No. PCT/CN2022/086353, filed on Dec. 4, 2022, which is based on and claims priority of Chinese application for invention No. 202110600409.7, filed on May. 31, 2021, the disclosure of which is hereby incorporated into this disclosure by reference in its entirety.

TECHNICAL FIELD

This disclosure relates to a field of image rendering technology, in particular to a particle rendering method and apparatus.

BACKGROUND

In the field of computer graphics, collision detection mainly refers to detecting whether two or more objects are simultaneously occupying a same position in a virtual scene. Since the advent of computers, collision detection has been the subject of interest and research. With the development of computer technology, demand for realism in virtual scenes is also increasing, and collision detection is critical to realism and immersion of virtual scenes.

One of main purposes of particle collision detection is to determine rendering positions of particles. For example, if a snowflake particle is detected colliding with a ground in a rendered scene, it is necessary to render the snowflake particle at the point where it collides with the ground to prevent the snowflake particle from continuing to fall in the virtual scene after colliding with the ground; if no collision with the ground is detected in the rendered scene, the snowflake particle should be rendered at a position that it reaches at a preset fall speed. Regular particle collision detection method comprises: calculating a motion trajectory of a particle at a time corresponding to each image frame without considering other objects in the rendered scene; then, determining whether the particle collided with the other objects in the rendered scene based on the motion trajectory of the particle and position information of other objects in the rendered scene, and determining position information of the particle.

SUMMARY

In a first aspect, an embodiment of the present disclosure provides a particle rendering method, comprising:

obtaining state information of a target particle;

obtaining a fall duration of the target particle if the state information is first state information indicating that no collision with the target particle occurred;

obtaining a first position based on the fall duration and a fall speed of the target particle; and rendering the target particle to be at the first position.

As an optional embodiment of the present disclosure, the method further comprises:

obtaining a collision time of the target particle if the state information is second state information indicating that a collision with the target particle occurred, the collision time indicating a fall duration of the target particle before the collision occurred;

obtaining a second position based on the collision time and the fall speed of the target particle; and rendering the target particle to be at the second position.

As an optional embodiment of the present disclosure, the method further comprises:

obtaining a first depth value and a second depth value after obtaining the first position, the first depth value being a depth value of the first position in a screen space, and the second depth value being a scene depth value corresponding to the first position in the screen space;

determining whether the first depth value is greater than the second depth value;

if the first depth value is greater than the second depth value, changing the state information of the target particle to second state information indicating that a collision with the target particle occurred, and storing the fall duration as a collision time of the target particle, the collision time indicating a fall duration of the target particle before the collision occurred.

As an optional embodiment of the present disclosure, the method further comprises:

obtaining a collision position of the target particle if the state information is second state information indicating that a collision with the target particle occurred, the collision position indicating a position where the target particle located when the collision occurred; and rendering the target particle at the collision position.

As an optional embodiment of the present disclosure, the method further comprises:

obtaining a first depth value and a second depth value after obtaining the first position, the first depth value being a depth value of the first position in a screen space, and the second depth value being a scene depth value corresponding to the first position in the screen space;

determining whether the first depth value is greater than the second depth value;

if the first depth value is greater than the second depth value, changing the state information of the target particle to second information indicating that a collision with the target particle occurred, and storing the first position as a collision position of the target particle, the collision position indicating a position where the target particle located when the collision occurred.

As an optional embodiment of the present disclosure, obtaining a first depth value comprises:

obtaining coordinate values of the first position in a world space based on coordinate values of the first position in a local space and a model matrix;

obtaining coordinate values of the first position in a view space based on coordinate values of the first position in the world space and a view matrix;

obtaining coordinate values of the first position in a clip space based on the coordinate values of the first position in the view space and a projection matrix;

normalizing the coordinate values of the first position in the clip space to obtain coordinate values of the first position in the screen space; and obtaining the first depth value based on the coordinate values of the first position in the screen space.

As an optional embodiment of the present disclosure, the method further comprises:

controlling the particle to return to an initial position thereof and resetting the fall duration of the particle to zero when the fall duration of the particle reaches a duration threshold, and updating the state information of the target particle with the first state information.

In a second aspect, an embodiment of the present disclosure provides a particle rendering apparatus, comprising:

an obtaining unit for obtaining state information of a target particle;

a processing unit for obtaining a fall duration of the target particle if the state information is first state information indicating that no collision with the target particle occurred;

a calculation unit for obtaining a first position based on the fall duration and a fall speed of the target particle; and a rendering unit for rendering the target particle to be at the first position.

As an optional embodiment of the present disclosure, the processing unit is further used for obtaining a collision time of the target particle if the state information is second state information indicating that a collision with the target particle occurred, the collision time indicating a fall duration of the target particle before the collision occurred;

the calculation unit is further used for obtaining a second position based on the collision time and the fall speed of the target particle; and the rendering unit is further used for rendering the target particle to be at the second position.

As an optional embodiment of the present disclosure, the processing unit is further used for, after the calculation unit obtains the first position, obtaining a first depth value and a second depth value after obtaining the first position, the first depth value being a depth value of the first position in a screen space, and the second depth value being a scene depth value corresponding first position in the screen space; determining whether the first depth value is greater than the second depth value; if the first depth value is greater than the second depth value, changing the state information of the target particle to second state information indicating that a collision with the target particle occurred, and storing the fall duration as a collision time of the target particle, the collision time indicating a fall duration of the target particle before the collision occurred.

As an optional embodiment of the present disclosure, the processing unit is further used for obtaining a collision position of the target particle if the state information is second state information indicating that a collision with the target particle occurred, the collision position indicating a position where the target particle located when the collision occurred; and the rendering unit is further used for rendering the target particle at the collision position.

As an optional embodiment of the present disclosure, the processing unit is further used for, after the calculation unit obtains the first position, obtaining a first depth value and a second depth value after obtaining the first position, the first depth value being a depth value of the first position in a screen space, and the second depth value being a scene depth value corresponding to the first position in the screen space; determining whether the first depth value is greater than the second depth value; if the first depth value is greater than the second depth value, changing the state information of the target particle to second state information indicating that a collision with the target particle occurred, and storing the first position as a collision position of the target particle, the collision position indicating a position where the target particle located when the collision occurred.

As an optional embodiment of the present disclosure, the processing unit is particularly used for obtaining coordinate values of the first position in a world space based on coordinate values of the first position in a local space and a model matrix; obtaining coordinate values of the first position in a view space based on coordinate values of the first position in the world space and a view matrix; obtaining coordinate values of the first position in a clip space based on the coordinate values of the first position in the view space and a projection matrix; normalizing the coordinate values of the first position in the clip space to obtain coordinate values of the first position in the screen space; and obtaining the first depth value based on the coordinate values of the first position in the screen space.

As an optional embodiment of the present disclosure, the processing unit is further used for controlling the particle to return to an initial position thereof and resetting the fall duration of the particle to zero when the fall duration of the particle reaches a duration threshold, and updating the state information of the target particle with the first state information.

In a third aspect, an embodiment of the present disclosure provides an electronic device, comprising: a memory for storing a computer program; and a processor that, when executing the computer program, causes the electronic device to implement the particle rendering method according to any of the above embodiments.

In a fourth aspect, an embodiment of the present disclosure provides a non-transitory computer-readable storage medium stored thereon a computer program that, when executed by a computing device, causes the computing device to implement the particle rendering method according to any of the above embodiments.

In a fifth aspect, an embodiment of the present disclosure provides a computer program product that, when running on a computer, causes the computer to implement the particle rendering method according to any of the above embodiments.

In a sixth aspect, the present disclosure provides a computer program, comprising: instructions that, when executed by a processor, cause the processor to implement the particle rendering method according to any of the above embodiments.

BRIEF DESCRIPTION OF THE DRAWINGS

Herein, the accompanying drawings, which are incorporated in and constitute a part of this specification, illustrate embodiments of the present disclosure and, together with the description, serve to explain the principles of the present disclosure.

In order to more clearly explain the embodiments of the present invention or the technical solutions in the prior art, a brief introduction will be given below for the drawings required to be used in the description of the embodiments or the prior art. It is obvious that, for a person skilled in the art, he or she may also acquire other drawings according to such drawings on the premise that no inventive effort is involved.

DETAILED DESCRIPTION

In order to better understand the above objects, features and advantages of the present disclosure, the scheme of the present disclosure will be further described below. It should be noted that, in the case of no conflict, the embodiments and the features of the embodiments of the present disclosure may be combined with each other.

Many specific details are set forth in the following description to facilitate a full understanding of the present disclosure, but the present disclosure can also be implemented in other ways different from those described herein. Obviously, embodiments described in the description are only some embodiments of the present disclosure, and are not all of embodiments thereof.

In the present disclosed embodiment, words such as "as an illustration" or "for example" are used to provide examples, illustrations, or explanations. Any embodiments or designs described with "as an illustration" or "for example" in the embodiments of the present disclosure should not be construed as being more preferred or advantageous than other embodiments or designs. In particular, the use of words such as "as an illustration" or "for example" is intended to present relevant concepts in a particular way. Moreover, in the description of the embodiments of the present disclosure, unless otherwise indicated, the phrase "a plurality of" means "two or more".

The regular particle collision detection method needs to calculate the motion trajectory of the particle at the time corresponding to the each image frame, and determine whether the particle collided with the other objects in the rendered scene based on the motion trajectory of the particle and the position information of the other objects in the rendered scene. With development of virtualization technology, complexity of virtual scenes increases and fineness of objects increases, resulting in an increasing amount of computation for particle collision detection. Therefore, the current particle collision detection method cannot meet real-time requirements of particle rendering. In view of this, embodiments of the present disclosure provide a particle rendering method and apparatus, capable of reducing the amount of computation required for particle rendering.

Figure 1:
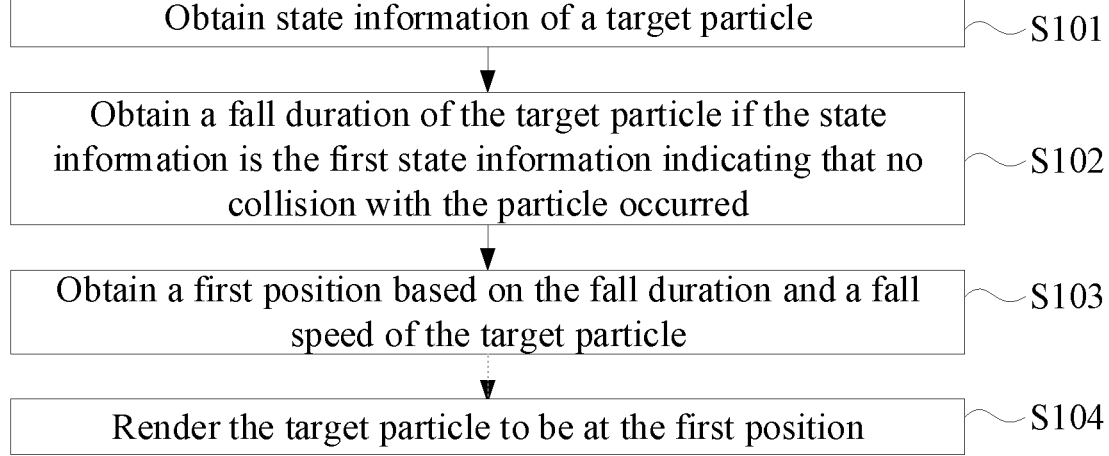
FIG. 1 is a first flowchart of a particle rendering method provided in an embodiment of the present disclosure.

An embodiment of the present embodiment provides a particle rendering method. As shown in FIG. 1, the particle rendering method comprises the following steps.

In S101, state information of a target particle is obtained.

Specifically, the state information in the embodiment of this disclosure is information indicating a collision state of the particle, comprising first state information indicating that no collision with the particle occurred, and second state information indicating that a collision with the particle occurred.

As an example, values carried by a preset number of bits can be used as the state information of the target particle. For example, a one bit value can be used as the state information of the target particle. If this bit has a value of 0, it indicates that no collision with the target particle occurred; if this bit has a value of 1, it indicates that a collision with the target particle occurred.

It should be noted that the collision with the target particle may be a collision between the target particle and a ground in the rendered scene, or a collision between the target particle and other objects in the rendered scene, which is not limited in the embodiments of the present disclosure.

In S102, a fall duration of the target particle is obtained if the state information is the first state information indicating that no collision with the particle occurred.

For example, the fall duration of the target particle can be obtained based on a time when the particle starts to fall and a current time. The time when the particle starts to fall may be a last time the target particle has its fall duration reset to zero. For example, if the fall duration of the target particle was last reset to zero at t0, and the current time is t1, then the fall duration of the target particle is t1-t0.

As an example, the fall duration of the target particle can also be obtained based on a current image frame to be rendered. For example, if the current frame to be rendered is the 30th frame, a frame refresh rate is 60 Hz/s, and the particle falls from the first frame, the fall duration of the particle is 0.5 seconds.

In S103, a first position is obtained based on the fall duration and a fall speed of the target particle.

The fall speed of the target particle in this embodiment can be specified by the user in advance based on a type of particle. It should be noted that the target particle can fall at a predetermined constant velocity, at an increased or decreased velocity based on a preset acceleration and an initial speed.

It should be noted that based on the fall duration and the fall speed of the target particle, only a vertical position coordinate of the target particle can be obtained. If it is required to determine the position of the target particle in three-dimensional space, position coordinates of the target particle in the horizontal plane must also be obtained. In an optional embodiment of the present disclosure, the method of the obtaining the position coordinates of the target particle in the horizontal plane may comprise: obtaining the position coordinates of the target particle in the horizontal plane based on initial position coordinates thereof. This means that the target particle is controlled to fall in a vertical direction, and the position coordinates of the target particle in the horizontal plane are always the same as the initial position.

In S104, the target particle is rendered to be at the first position.

The particle rendering method provided in the embodiment of the present disclosure comprises first obtaining the state information of the target particle; obtaining a fall duration of the target particle if the state information is the first state information indicating that no collision with the target particle occurred; obtaining the first position according to the fall duration and the fall speed of the target particle; and rendering the target particle to be at the first position. That is, the particle rendering method provided in this embodiment adds the state information to the particle, indicating whether the collision with the particle occurred; the position of the particle is directly calculated based on its fall duration and fall speed if the state information indicates that no collision with the particle occurred, and the particle is rendered at the calculated position. Since the particle rendering method provided in the embodiment of the present disclosure can determine whether the collision with the particle occurred based on the state information of the particle, this particle rendering method does not need to calculate the motion trajectory of the particle at the time corresponding to the each image frame, and determine whether the particle collided with other objects in the rendered scene based on the motion trajectory of the particle and the position information of other objects in the rendered scene. Therefore, the particle rendering method provided in the embodiment of the present disclosure can reduce the amount of computation required to obtain particle positions, thereby reducing the amount of computation required for particle rendering, and improving computational efficiency.

Figure 2:
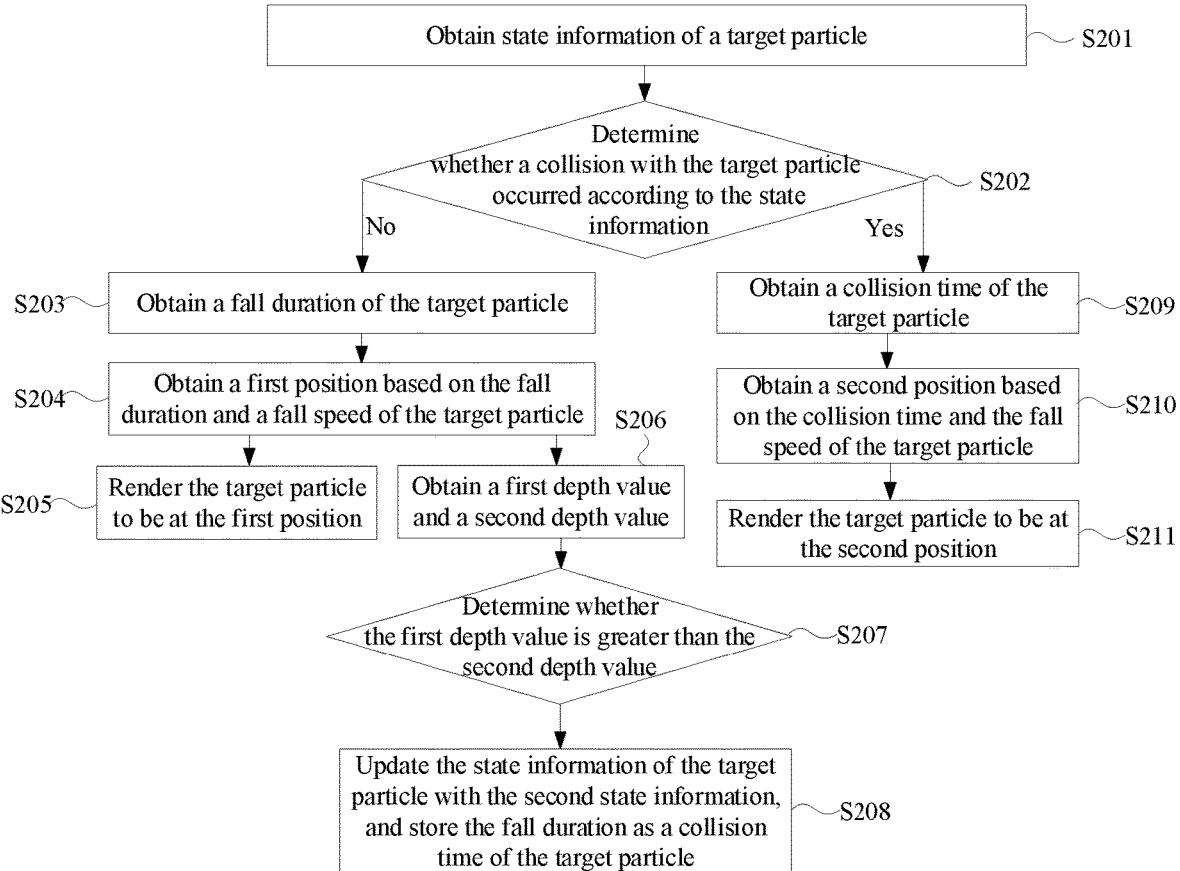
FIG. 2 is a second flowchart of the particle rendering method provided in an embodiment of the present disclosure.

An embodiment of the present embodiment provides another particle rendering method. As shown in FIG. 2, the particle rendering method comprises the following steps.

In S201, state information of a target particle is obtained.

As mentioned above, the state information this embodiment is information indicating a collision state of the particle, comprising first state information indicating that no collision with the particle occurred, and second state information indicating that a collision with the particle occurred.

In S202, whether a collision with the target particle occurred is determined according to the state information.

Specifically, the method of the above step S202 (determining whether the collision with the target particle occurred according to the state information) comprises: determining that no collision occurred with the target particle if the state information is the first state information indicating that no collision with the target particle occurred; and determining that a collision occurred with the target particle if the state information is the second state information indicating that the collision with the target particle occurred.

In the above step S202, if it is determined that no collision with the target particle occurred, the following steps S203 to S208 are executed.

In S203, a fall duration of the target particle is obtained.

In S204, a first position is obtained based on the fall duration and a fall speed of the target particle.

In S205, the target particle is rendered to be at the first position.

For the implementation and explanation of the above steps S203 to S205, reference can be made to the implementation and explanation of steps S102 to S104 of the embodiment shown in FIG. 1, which will not be repeated here.

In S206, a first depth value and a second depth value are obtained.

The first depth value is a depth value of the first position in a screen space, and the second depth value is a scene depth value corresponding to the first position in the screen space.

The depth value of a position in the embodiment of the present disclosure is used to represent the distance from the position to a camera in the screen space. For example, the depth value of the first position is used to represent a distance value from the first position to the camera in the screen space.

The scene depth value corresponding to a position in the embodiment of the present disclosure is used to represent a distance value from a rendered scene corresponding to the position to a camera in the screen space.

In S207, whether the first depth value is greater than the second depth value is determined.

In the above step S207, if the first depth value is greater than the second depth value, the following step S208 is executed; and if the first depth value is less than or equal to the second depth value, it is determined that no collision with the particle occurred, and there is no need to update the state information. The particle continues to fall, and this rendering process ends.

In S208, the state information of the target particle is updated with the second state information, and the fall duration is stored as a collision time of the target particle.

The collision time is used to indicate a fall duration of the target particle before the collision occurred.

On one hand, the above embodiment can obtain the depth value of a position where the target particle located and the scene depth corresponding to the position where the target particle located, and determines whether the collision with the target particle occurred based on the depth value of the position where the target particle locates and the scene depth corresponding to the position where the target particle locates. That is, the above embodiment provides a method for detecting whether a particle collision occurred based on depth values. Compared to detecting whether a particle collision has occurred based on the particle motion trajectory and the positions of objects in the rendered scene, this method can reduce the amount of computation required to detect whether a particle collision has occurred.

On the other hand, since the above embodiment can change the state information of the target particle with the second state information indicating that the collision with the target particle occurred after determining that the collision with the target particle occurred, and save the fall duration of the target particle as the collision time indicating the fall duration of the target particle before the collision occurred, in the subsequent rendering process, a collision position of the target particles can be directly calculated based on the collision time, without the need to first detect whether a collision with the target particle occurred, and then calculate the collision position of the target particle. Therefore, the above method can further reduce the amount of computation required to render the target particle.

In the above step S202, if it is determined that a collision with the target particle occurred (the state information is the second state information indicating that the collision with the target particle occurred), the following steps S209 to S211 are executed.

In S209, a collision time of the target particle is obtained.

The collision time is used to indicate a fall duration of the target particle before the collision occurred.

In S210, a second position is obtained based on the collision time and the fall speed of the target particle.

It should be noted that the second position is the position where the target particle located when the collision occurred.

Suppose that the collision time is t, the fall speed of the target particle is: $u_{vel}$, and the second position is: pos·y, then the second position pos·y=t* $u_{vel}$.

In S211, the target particle is rendered to be at the second position.

Since the target particle will stay at the second position after the collision, rendering the target particle to be at the second position can make its motion match the particle trajectory in the real world, thereby improving realism of particle rendering.

Figure 3:
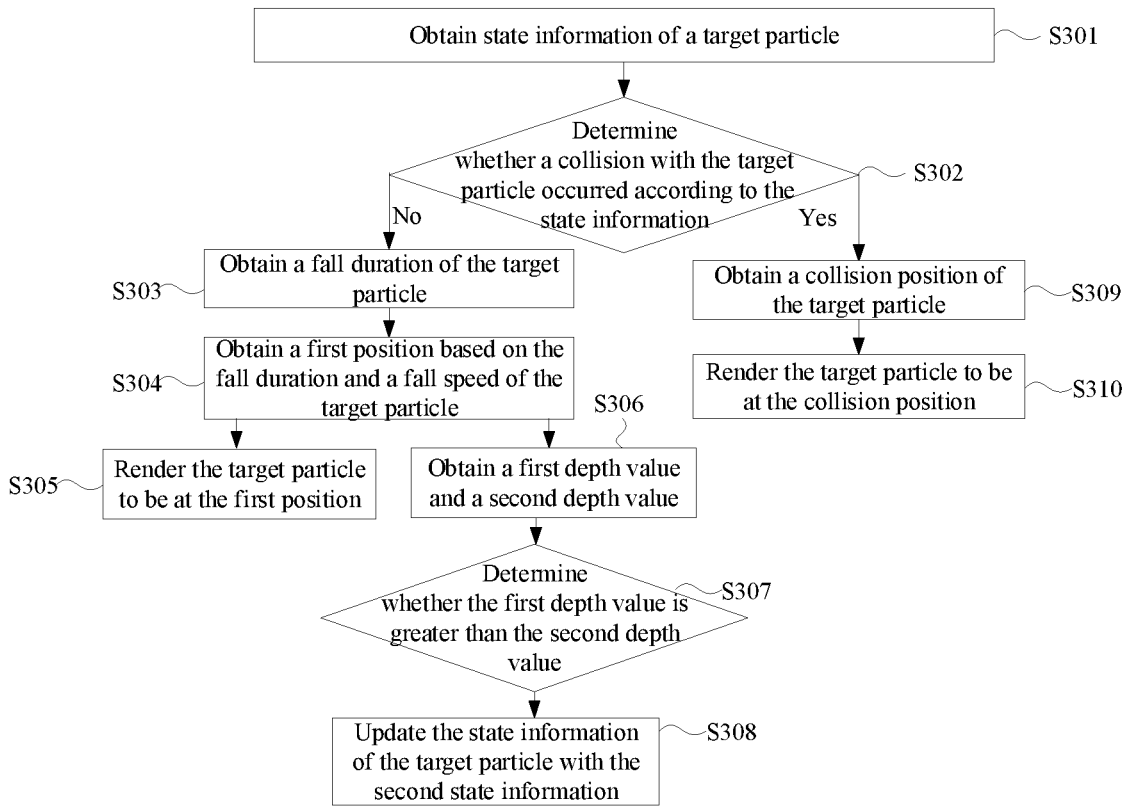
FIG. 3 is a third flowchart of the particle rendering method provided in an embodiment of the present disclosure.

An embodiment of the present embodiment further provides another particle rendering method. As shown in FIG. 3, the particle rendering method comprises the following steps.

In S301, state information of a target particle is obtained.

In S302, whether a collision with the target particle occurred is determined according to the state information.

Specifically, the method of the above step S302 (determining whether the collision with the target particle occurred according to the state information) comprises: determining that no collision occurred with the target particle if the state information is first state information indicating that no collision with the target particle occurred; and determining that a collision occurred with the target particle if the state information is second state information indicating that a collision with the target particle occurred.

In the above step S302, if it is determined that no collision with the target particle occurred (the state information is the first state information), the following steps S303 to S308 are executed.

In S303, a fall duration of the target particle is obtained.

In S304, a first position is obtained based on the fall duration and a fall speed of the target particle.

In S305, the target particle is rendered to be at the first position.

For the implementation and explanation of the above steps S303 to S305, reference can be made to the implementation and explanation of steps S102 to S104 of the embodiment shown in FIG. 1, which will not be repeated here.

In S306, a first depth value and a second depth value are obtained.

The first depth value is a depth value of the first position in a screen space, and the second depth value is a scene depth value corresponding to the first position in the screen space.

The depth value of a position in the embodiment of the present disclosure is used to represent a distance from the position to a camera in the screen space. For example, the depth value of the first position is used to represent a distance value from the first position to the camera in the screen space.

The scene depth value corresponding to a position in the embodiment of the present disclosure is used to represent a distance value from a rendered background corresponding to the position to the camera in screen space.

In S307, whether the first depth value is greater than the second depth value is determined.

In the above step S307, if the first depth value is greater than the second depth value, the following step S308 is executed; and if the first depth value is less than or equal to the second depth value, this rendering process ends.

In S308, the state information of the target particle is updated with the second state information, and the first position is stored as a collision position of the target particle.

The collision position is used to indicate a position where the target particle located when the collision occurred.

On one hand, the above embodiment can obtain the depth value of the position where the target particle located and the scene depth corresponding to the position where the target particle located, and determines whether a collision with the target particle occurred based on the depth value of the position where the target particle located and the scene depth corresponding to the position where the target particle located. That is, the above embodiment provides a method for detecting whether a particle collision occurred based on depth values. Compared to detecting whether a particle collision occurred based on a particle motion trajectory and the positions of objects in the rendered scene, this method can reduce the amount of computation required to detect whether a particle collision has occurred.

On the other hand, since the above embodiment can save the first position as the collision position indicating the position where the target particle located when the collision occurred after determining that the collision with the target particle occurred, in the subsequent rendering process, the target particle can be directly rendered according to the collision position, and there is no need to determine whether a collision with the target particle occurred according to a motion time and a motion trajectory of the target particle, or to calculate a collision position of the target particle. Therefore, the above method can further reduce the amount of computation required to render the target particle.

In the above step S302, if it is determined that the state information is the second state information indicating that a collision with the target particle occurred, the following steps S309 to S310 are executed.

In S309, a collision position of the target particle is obtained.

The collision position is used to indicate a position where the target particle located when the collision occurred.

In S310, the target particle is rendered at the collision position.

Since the target particle will stay at the collision position after the collision, rendering the target particle at the collision position can make its motion match the particle trajectory in the real world, thereby improving the realism of particle rendering.

The embodiment shown in FIG. 3 differs from the embodiment shown in FIG. 2 in that the collision time of the target particle is stored in the embodiment of FIG. 2, while the collision position of the target particle is stored in the embodiment of FIG. 3. In the case of storing the collision time of the target particle, it is still necessary to calculate a collision position based on the collision time and the fall speed during rendering. However, the amount of time information is smaller, thereby making its storage easier. In the case of storing the collision position of the target particle, the particle can be directly rendered based on the collision position, without the need for additional calculations. However, the amount of position information data is larger, requiring a larger storage space. In actual use, the particle rendering method provided in the embodiment shown in FIG. 2 or FIG. 3 can be selected according to the actual needs for particle rendering.

As an optional embodiment of the present disclosure, the step S206/S306 (obtaining the first depth value) of the embodiment shown in FIG. 2 or 3 may comprise the following steps.

In step a, coordinate values of the first position in a world space are obtained based on coordinate values of the first position in a local space and a model matrix.

Specifically, the local space in this embodiment refers to a coordinate space corresponding to a particle model. The world space is a coordinate space used to define locations of various models. A model matrix is a transformation matrix that can place a model in the world space through transformations, such as model translating, scaling, or rotating. Therefore, coordinate values of the first position in world space can be obtained based on the coordinate values of the first position in the local space and the model matrix.

In step b, coordinate values of the first position in view space are obtained based on the coordinate values of the first position in world space and a view matrix.

Specifically, the view space, also known as a camera space, is a result of transforming the world space into a coordinate space that is in front of a user's field of view. The view space is thus a space as seen from a camera's point of view. The transformation of the world space into coordinates that are in front of the user's field of view is usually accomplished with a combination of translations and rotations. These combined transformations are generally stored inside the view matrix. Therefore, the coordinate values of the first position in the view space can be obtained based on the coordinate values of the first position in the world space and the view matrix.

In step c, coordinate values of the first position in a clip space are obtained based on the coordinate values of the first position in the view space and a projection matrix.

Specifically, at the end of the rendering system's operation, the rendering system expects all points to be within a specific range, and any point outside this feature range should be clipped. Coordinates that are clipped are discarded, so the remaining coordinates will end up as fragments visible on the screen. The space formed by the visible fragments on the screen is the clip space in the embodiment of the present disclosure. A matrix used to transform coordinates in the view space to coordinates in the clip space is the so called projection matrix. Thus, the coordinate values of the first position in the clip space can be obtained based on the coordinate values of the first position in the view space and the projection matrix.

In step d, the coordinate values of the first position in the clip space are normalized to obtain coordinate values of the first position in the screen space.

In step e, the first depth value is obtained based on the coordinate values of the first position in the screen space.

Figure 4:
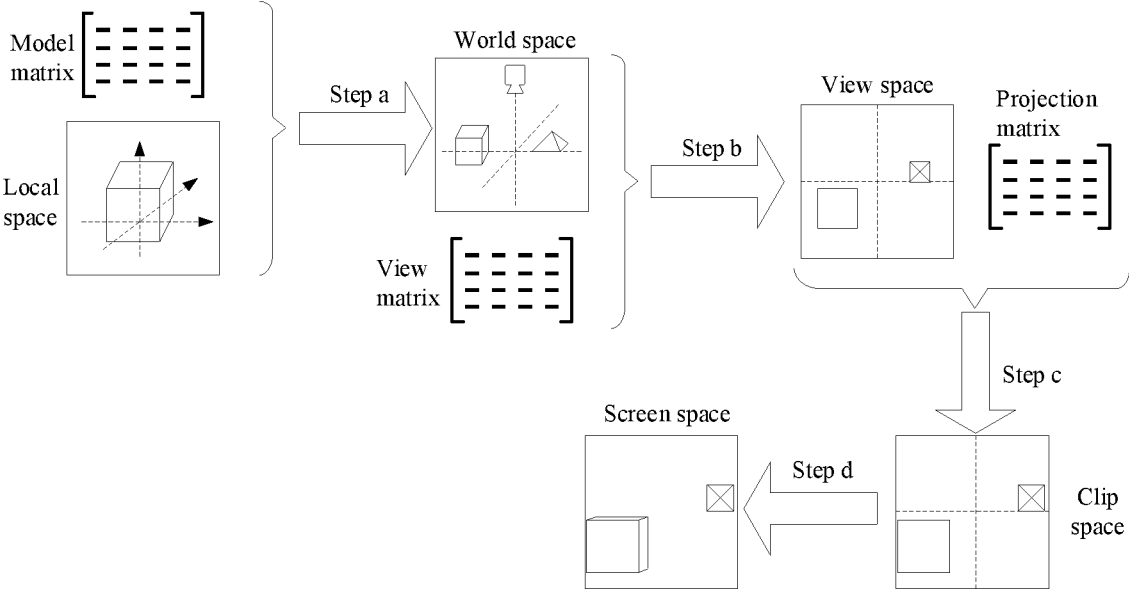
FIG. 4 is a schematic diagram of spatial conversion provided in an embodiment of the present disclosure.

As shown in FIG. 4, the process of the obtaining the first depth value comprises: converting the local space into the world space based on the model matrix, converting the world space into the view space based on the view matrix, converting the view space into the clip space based on the projection matrix, and normalizing the clip space to convert the clip space into the screen space, and then obtaining the first depth value based on the coordinates of the first position in screen space.

As an optional embodiment of the present disclosure, based on the particle rendering method provided in the above embodiments, the particle rendering method provided in the embodiment of the present disclosure further comprises:

controlling the particle to return to an initial position thereof and resetting the fall duration of the particle to zero when the fall duration of the particle reaches a duration threshold, and updating the state information of the target particle with the first state information.

This means that the particle falls in the rendered scene with a certain period, periodically.

As an example, the duration threshold may be 1 minute; the particle is controlled to return to the initial position thereof every 1 minute. In addition, the particle's fall duration is reset to zero, and the state information of the target particle is updated with the first state information.

Based on the same inventive concept, as an implementation of the above method, a particle rendering apparatus is further provided in an embodiment of the present disclosure. This apparatus embodiment corresponds to the above method embodiment. For ease of reading, the contents of the above method embodiment will not be explained in detail in this apparatus embodiment, but it should be clarified that all the contents of the above method embodiment can be achieved correspondingly in this particle rendering apparatus.

Figure 5:
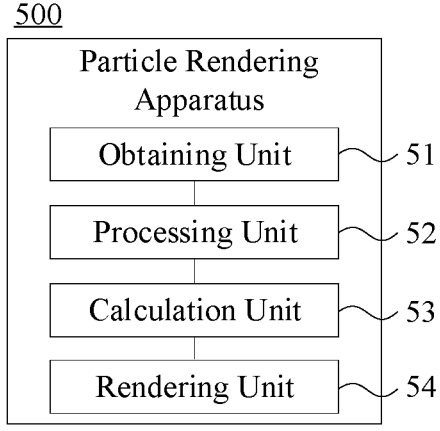
FIG. 5 is a structural diagram of a particle rendering apparatus provided in an embodiment of the present disclosure.

An embodiment of the present disclosure provides a particle rendering apparatus. FIG. 5 is a schematic structure diagram of the particle rendering apparatus. As shown in FIG. 5, the particle rendering apparatus 500 comprises:

an obtaining unit 51 for obtaining state information of a target particle;

a processing unit 52 for obtaining a fall duration of the target particle if the state information is first state information indicating that no collision with the target particle occurred;

a calculation unit 53 for obtaining a first position based on the fall duration and a fall speed of the target particle; and a rendering unit 54 for rendering the target particle to be at the first position.

As an optional embodiment of the present disclosure, the processing unit 52 is further used for obtaining a collision time of the target particle if the state information is second state information indicating that a collision with the target particle occurred, the collision time indicating a fall duration of the target particle before the collision occurred;

the calculation unit is further used for obtaining a second position based on the collision time and the fall speed of the target particle; and the rendering unit is further used for rendering the target particle to be at the second position.

As an optional embodiment of the present disclosure, the processing unit 52 is further used for, after the calculation unit 53 obtains the first position, obtaining a first depth value and a second depth value after obtaining the first position, the first depth value being a depth value of the first position in a screen space, and the second depth value being a scene depth value corresponding to the first position in the screen space; determining whether the first depth value is greater than the second depth value; if the first depth value is greater than the second depth value, changing the state information of the target particle to second state information indicating that a collision with the target particle occurred, and storing the fall duration as a collision time of the target particle, the collision time indicating a fall duration of the target particle before the collision occurred.

As an optional embodiment of the present disclosure, the processing unit 52 is further used for obtaining a collision position of the target particle if the state information is second state information indicating that a collision with the target particle occurred, the collision position indicating a position where the target particle located when the collision occurred; and the rendering unit 54 is further used for rendering the target particle at the collision position.

As an optional embodiment of the present disclosure, the processing unit 52 is further used for, after the calculation unit 53 obtains the first position, obtaining a first depth value and a second depth value after obtaining the first position, the first depth value being a depth value of the first position in a screen space, and the second depth value being a scene depth value corresponding to the first position in the screen space; determining whether the first depth value is greater than the second depth value; if the first depth value is greater than the second depth value, changing the state information of the target particle to second state information indicating that a collision with the target particle occurred, and storing the first position as a collision position of the target particle, the collision position indicating a position where the target particle located when the collision occurred.

As an optional embodiment of the present disclosure, the processing unit 52 is particularly used for obtaining coordinate values of the first position in a world space based on coordinate values of the first position in a local space and a model matrix; obtaining coordinate values of the first position in a view space based on coordinate values of the first position in the world space and a view matrix; obtaining coordinate values of the first position in a clip space based on the coordinate values of the first position in the view space and a projection matrix; normalizing the coordinate values of the first position in the clip space to obtain coordinate values of the first position in the screen space;

and obtaining the first depth value based on the coordinate values of the first position in the screen space.

As an optional embodiment of the present disclosure, the processing unit 52 is further used for controlling the particle to return to an initial position thereof and resetting the fall duration of the particle to zero when the fall duration of the particle reaches a duration threshold, and updating the state information of the target particle with the first state information.

Figure 6:
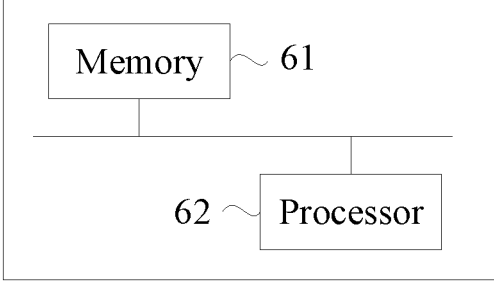
FIG. 6 is a schematic diagram showing the hardware structure of an electronic device provided in an embodiment of the present disclosure.

Based on the same inventive concept, an embodiment of the present disclosure further provides an electronic device. FIG. 6 is a schematic diagram showing the structure of the electronic device provided in an embodiment of the present disclosure. As shown in FIG. 6, the electronic device provided in this embodiment comprises: a memory 61 for storing a computer program; and a processor 62 that, when executing the computer program, causes the electronic device to implement the particle rendering method according to any of the above embodiments.

An embodiment of the present disclosure further provides a non-transitory computer-readable storage medium stored thereon a computer program that, when executed by a computing device, causes the computing device to implement the particle rendering method according to any of the above embodiments.

An embodiment of the present disclosure further provides a computer program product that, when running on a computer, causes the computer to implement the particle rendering method according to any of the above embodiments.

One skilled in the art should understand that, the embodiments of the present disclosure may be provided as a method, a system, or a computer program product. Therefore, embodiments of the present disclosure can take the form of an entirely hardware embodiment, an entirely software embodiment or an embodiment containing both hardware and software elements. Moreover, the present disclosure may take the form of a computer program product embodied on one or more computer-usable storage media having computer-usable program code embodied therein.

The processors may be central processing units (CPUs) or other general-purpose processors, digital signal processors (DSPs), application specific integrated circuits (ASICs), field programmable gate arrays (FPGAs) or other programmable logic devices, or discrete hardware components such as discrete gates or transistors. The general -purpose processor may be a microprocessor, or the processor may be any conventional processor or the like.

The memory may include non-permanent memory in a computer-readable medium, random access memory (RAM) and/or non-volatile memory, such as read only memory (ROM) or flash RAM. The memory is an example of a computer-readable medium.

The computer-readable media include permanent and non-permanent, removable and non-removable storage media. The storage medium can realize information storage by any method or technology. The information can be computer-readable instructions, data structures, program modules, or other data. Examples of computer storage media include, but are not limited to, phase change memory (PRAM), static random access memory (SRAM), dynamic random access memory (DRAM), other types of random access memory (RAM), read-only memory (ROM), electrically erasable programmable read-only memory (EE-PROM), flash memory or other memory technologies, CD-ROM, digital versatile disc (DVD) or other optical storage, magnetic cassettes, magnetic tape, magnetic disk storage or other magnetic storage devices, or any other non-transmission media that can be used to store information that can be accessed by computing devices. According to the definition herein, computer-readable media does not include transitory media, such as modulated data signals and carrier waves.

It shall be noted that: the above embodiments are merely illustration of the technical solution of this disclosure, but are not limitation thereof. Although this disclosure has been described in detail with reference to the above embodiment, those ordinary skilled in the art shall understand: the technical solutions recited in the various embodiments described above may be modified or some technical features thereof or all the technical features may be substituted equivalently, such modifications or substitutions do not deviate the nature of the technique from the scope of the technique embodied in the embodiments according to this disclosure.

What is claimed is:

1. A particle rendering method, comprising:
obtaining state information of a target particle, wherein the state information of the target particle comprises values carried by a preset number of bits;
determining whether the state information is first state information indicating that no collision with the target particle occurred or second state information indicating that a collision with the target particle occurred;
in response to determining the state information being the first state information:
obtaining a fall duration of the target particle, wherein the fall duration of the target particle is obtained based on a time when the particle starts to fall and a current time;
obtaining a first position based on the fall duration and a fall speed of the target particle; and
rendering the target particle to be at the first position;
in response to determining the state information being the second state information:
obtaining a collision time of the target particle, the collision time indicating a fall duration of the target particle before the collision occurred;
obtaining a second position based on the collision time and the fall speed of the target particle; and
rendering the target particle to be at the second position.

2. The particle rendering method according to claim 1, further comprising:
obtaining a first depth value and a second depth value after obtaining the first position, the first depth value being a depth value of the first position in a screen space, and the second depth value being a scene depth value corresponding to the first position in the screen space;
determining whether the first depth value is greater than the second depth value;
in response to determining the first depth value being greater than the second depth value, changing the state information of the target particle to second state information indicating that a collision with the target particle occurred, and storing the fall duration as a collision time of the target particle, the collision time indicating a fall duration of the target particle before the collision occurred.

3. The particle rendering method according to claim 2, wherein the obtaining the first depth value comprises:
obtaining coordinate values of the first position in a world space based on coordinate values of the first position in a local space and a model matrix;
obtaining coordinate values of the first position in a view space based on coordinate values of the first position in the world space and a view matrix;

obtaining coordinate values of the first position in a clip space based on the coordinate values of the first position in the view space and a projection matrix;

normalizing the coordinate values of the first position in the clip space to obtain coordinate values of the first position in the screen space; and obtaining the first depth value based on the coordinate values of the first position in the screen space.

4. The particle rendering method according to claim 1, further comprising:

in response to determining the state information being the second state information:

obtaining a collision position of the target particle, the collision position indicating a position where the target particle located when the collision occurred; and rendering the target particle at the collision position.

5. The particle rendering method according to claim 1, further comprising:

obtaining a first depth value and a second depth value after obtaining the first position, the first depth value being a depth value of the first position in a screen space, and the second depth value being a scene depth value corresponding to the first position in the screen space;

determining whether the first depth value is greater than the second depth value;

in response to determining the first depth value being greater than the second depth value, changing the state information of the target particle to second state information indicating that a collision with the target particle occurred, and storing the first position as a collision position of the target particle, the collision position indicating a position where the target particle located when the collision occurred.

6. The method according to claim 5, wherein obtaining the first depth value comprises:

obtaining coordinate values of the first position in a world space based on coordinate values of the first position in a local space and a model matrix;

obtaining coordinate values of the first position in a view space based on coordinate values of the first position in the world space and a view matrix;

obtaining coordinate values of the first position in a clip space based on the coordinate values of the first position in the view space and a projection matrix;

normalizing the coordinate values of the first position in the clip space to obtain coordinate values of the first position in the screen space; and obtaining the first depth value based on the coordinate values of the first position in the screen space.

7. The particle rendering method according to claim 1, further comprising:

controlling the particle to return to an initial position thereof and resetting the fall duration of the particle to zero when the fall duration of the particle reaches a duration threshold, and updating the state information of the target particle with the first state information.

8. An electronic device, comprising:

a memory for storing a computer program; and a processor that, when executing the computer program, causes the electronic device to implement a particle rendering method comprising:

obtaining state information of a target particle, wherein the state information of the target particle comprises values carried by a preset number of bits;

determining whether the state information is first state information indicating that no collision with the target particle occurred or second state information indicating that a collision with the target particle occurred;

in response to determining the state information being the first state information:

obtaining a fall duration of the target particle, wherein the fall duration of the target particle is obtained based on a time when the particle starts to fall and a current time;

obtaining a first position based on the fall duration and a fall speed of the target particle; and rendering the target particle to be at the first position;

in response to determining the state information being the second state information:

obtaining a collision time of the target particle, the collision time indicating a fall duration of the target particle before the collision occurred;

obtaining a second position based on the collision time and the fall speed of the target particle; and rendering the target particle to be at the second position.

9. The electronic device according to claim 8, wherein the processor is configured to:

obtain a first depth value and a second depth value after obtaining the first position, the first depth value being a depth value of the first position in a screen space, and the second depth value being a scene depth value corresponding to the first position in the screen space;

determine whether the first depth value is greater than the second depth value;

in response to the first depth value being greater than the second depth value, change the state information of the target particle to second state information indicating that a collision with the target particle occurred, and store the fall duration as a collision time of the target particle, the collision time indicating a fall duration of the target particle before the collision occurred.

10. The electronic device according to claim 9, wherein the processor is configured to:

obtain coordinate values of the first position in a world space based on coordinate values of the first position in a local space and a model matrix;

obtain coordinate values of the first position in a view space based on coordinate values of the first position in the world space and a view matrix;

obtain coordinate values of the first position in a clip space based on the coordinate values of the first position in the view space and a projection matrix;

normalize the coordinate values of the first position in the clip space to obtain coordinate values of the first position in the screen space; and obtain the first depth value based on the coordinate values of the first position in the screen space.

11. The electronic device according to claim 8, wherein the processor is configured to:

in response to the state information being second state information indicating that a collision with the target particle:

obtain a collision position of the target particle, the collision position indicating a position where the target particle located when the collision occurred; and render the target particle at the collision position.

12. The electronic device according to claim 8, wherein the processor is configured to:

obtain a first depth value and a second depth value after obtaining the first position, the first depth value being a depth value of the first position in a screen space, and the second depth value being a scene depth value corresponding to the first position in the screen space;

determine whether the first depth value is greater than the second depth value;

in response to the first depth value being greater than the second depth value, change the state information of the target particle to second state information indicating that a collision with the target particle occurred, and store the first position as a collision position of the target particle, the collision position indicating a position where the target particle located when the collision occurred.

13. The electronic device according to claim 12, wherein the processor is configured to:

obtain coordinate values of the first position in a world space based on coordinate values of the first position in a local space and a model matrix;

obtain coordinate values of the first position in a view space based on coordinate values of the first position in the world space and a view matrix;

obtain coordinate values of the first position in a clip space based on the coordinate values of the first position in the view space and a projection matrix;

normalize the coordinate values of the first position in the clip space to obtain coordinate values of the first position in the screen space; and obtain the first depth value based on the coordinate values of the first position in the screen space.

14. The electronic device according to claim 8, wherein the processor is configured to:

control the particle to return to an initial position thereof and resetting the fall duration of the particle to zero when the fall duration of the particle reaches a duration threshold, and updating the state information of the target particle with the first state information.

15. A non-transitory computer-readable storage medium stored thereon a computer program that, when executed by a computing device, causes the computing device to implement a particle rendering method comprising:

obtaining state information of a target particle, wherein the state information of the target particle comprises values carried by a preset number of bits;

determining whether the state information is first state information indicating that no collision with the target particle occurred or second state information indicating that a collision with the target particle occurred;

in response to determining the state information being the first state information:

obtaining a fall duration of the target particle, wherein the fall duration of the target particle is obtained based on a time when the particle starts to fall and a current time;

obtaining a first position based on the fall duration and a fall speed of the target particle; and rendering the target particle to be at the first position;

in response to determining the state information being the second state information:

obtaining a collision time of the target particle, the collision time indicating a fall duration of the target particle before the collision occurred;

obtaining a second position based on the collision time and the fall speed of the target particle; and rendering the target particle to be at the second position.

16. The non-transitory computer-readable storage medium according to claim 15, wherein the particle rendering method further comprises:

obtaining a first depth value and a second depth value after obtaining the first position, the first depth value being a depth value of the first position in a screen space, and the second depth value being a scene depth value corresponding to the first position in the screen space;

determining whether the first depth value is greater than the second depth value;

in response to the first depth value being greater than the second depth value, changing the state information of the target particle to second state information indicating that a collision with the target particle occurred, and storing the fall duration as a collision time of the target particle, the collision time indicating a fall duration of the target particle before the collision occurred.

17. The non-transitory computer-readable storage medium according to claim 15, wherein the particle rendering method further comprises:

in response to the state information being second state information indicating that a collision with the target particle:

obtaining a collision position of the target particle, the collision position indicating a position where the target particle located when the collision occurred; and rendering the target particle at the collision position.

* * * * *